US009764429B2

(12) United States Patent
Chen et al.

(10) Patent No.: US 9,764,429 B2
(45) Date of Patent: Sep. 19, 2017

(54) FLUX-CORED WELDING WIRE, THE METHOD FOR MANUFACTURING THE SAME AND USING OF THE SAME (75) Inventors: Fuhu Chen, Dayton, OH (US); Jie Yan, Kunshan (CN)

(73) Assignee: ILLINOIS TOOL WORKS INC., Glenview, IL (US)

(*) Notice: Subject to any disclaimer, the term of this patent is extended or adjusted under 35 U.S.C. 154(b) by 543 days.

(21) Appl. No.: 14/232,104

(22) PCT Filed: Jul. 12, 2012

(86) PCT No.: PCT/US2012/046399
§ 371 (c)(1),
(2), (4) Date: Apr. 3, 2014

(87) PCT Pub. No.: WO2013/009951
PCT Pub. Date: Jan. 17, 2013

(65) Prior Publication Data
US 2014/0203008 A1    Jul. 24, 2014

(30) Foreign Application Priority Data
Jul. 13, 2011    (CN) .......................... 2011 1 0196187

(51) Int. Cl.
*B23K 35/02*        (2006.01)
*B23K 35/24*        (2006.01)
(Continued)

(52) U.S. Cl.
CPC ............ *B23K 35/0266* (2013.01); *B21C 1/00* (2013.01); *B23K 35/24* (2013.01); *B23K 35/30* (2013.01);
(Continued)

(58) Field of Classification Search
CPC .. B23K 35/30; B23K 35/308; B23K 35/3086; B23K 35/36; B23K 35/3602;
(Continued)

(56) References Cited

U.S. PATENT DOCUMENTS 3,125,470 A    3/1964    Witherell
3,495,069 A    2/1970    Cavanagh
(Continued)

FOREIGN PATENT DOCUMENTS

CN    101062533    10/2007
GB    1222582    2/1971
(Continued)

OTHER PUBLICATIONS

Lincoln Electric, Stainless Steels Welding Guide, Publication C6.4000 Issued Oct. 14, 2003.*
(Continued)

*Primary Examiner* — Justin Jonaitis
(74) *Attorney, Agent, or Firm* — Fletcher Yoder P.C.

(57) ABSTRACT

The present invention provides a flux-cored welding wire comprising a shell having a tubular cavity, which accommodates flux. The shell is made of 400 series stainless steels. The deposited metal formed after the welding using the flux-cored welding wire of the present invention has more uniform chemical compositions. Because the loss of chromium during the transition to the deposited metal is less than 0.1%, recourses is saved and welding cost is reduced. The filling ratio of the flux-cored welding wire of the present invention is 5%-25% (preferably 10%-20%). As a result, not only the stability of the compositions in the flux is increased, but also the disadvantages to the manufacture process caused by high filling ratio are avoided. The flux-cored welding wire of the present invention will not be rusty even after it is exposed to the air for a long time.

24 Claims, 3 Drawing Sheets (51) Int. Cl.
*B23K 35/30* (2006.01)
*B23K 35/36* (2006.01)
*B23K 35/362* (2006.01)
*B23K 35/40* (2006.01)
*C21D 9/00* (2006.01)
*C21D 9/52* (2006.01)
*C22C 38/18* (2006.01)
*C22C 38/28* (2006.01)
*C22C 38/02* (2006.01)
*C22C 38/04* (2006.01)
*C22C 38/26* (2006.01)
*C22C 38/34* (2006.01)
*C22C 38/38* (2006.01)
*C22C 38/40* (2006.01)
*C22C 38/44* (2006.01)
*C22C 38/48* (2006.01)
*C22C 38/50* (2006.01)
*C22C 38/58* (2006.01)
*B21C 1/00* (2006.01)

(52) U.S. Cl.
CPC ........ *B23K 35/308* (2013.01); *B23K 35/3086* (2013.01); *B23K 35/36* (2013.01); *B23K 35/362* (2013.01); *B23K 35/3602* (2013.01); *B23K 35/3607* (2013.01); *B23K 35/3608* (2013.01); *B23K 35/406* (2013.01); *C21D 9/0068* (2013.01); *C21D 9/525* (2013.01); *C22C 38/02* (2013.01); *C22C 38/04* (2013.01); *C22C 38/18* (2013.01); *C22C 38/26* (2013.01); *C22C 38/28* (2013.01); *C22C 38/34* (2013.01); *C22C 38/38* (2013.01); *C22C 38/40* (2013.01); *C22C 38/44* (2013.01); *C22C 38/48* (2013.01); *C22C 38/50* (2013.01); *C22C 38/58* (2013.01)

(58) Field of Classification Search
CPC ............ B23K 35/3607; B23K 35/3608; B23K 35/362; B23K 35/406; C21D 9/0068; C21D 9/525; C22C 38/02; C22C 38/04; C22C 38/18; C22C 38/26; C22C 38/28; C22C 38/34; C22C 38/38; C22C 38/40; C22C 38/44; C22C 38/48; C22C 38/50; C22C 38/58

USPC .................................................... 219/145.22
See application file for complete search history.

(56) References Cited

U.S. PATENT DOCUMENTS

| | | | |
|---|---|---|---|
| 4,149,063 A | 4/1979 | Bishel | |
| 4,339,286 A | 7/1982 | Kasatkin | |
| 5,308,698 A | 5/1994 | Bishel | |
| 6,835,913 B2* | 12/2004 | Duncan | B23K 9/04 219/137 WM |
| 7,491,910 B2* | 2/2009 | Kapoor | B23K 35/0261 219/145.1 |
| 8,168,922 B2 | 5/2012 | Kotecki | |
| 2008/0264924 A1 | 10/2008 | Duncan | |
| 2011/0114606 A1 | 5/2011 | Suzuki | |

FOREIGN PATENT DOCUMENTS

| | | |
|---|---|---|
| JP | S49017335 | 2/1974 |
| JP | 58151993 | 9/1983 |
| JP | S59130698 | 7/1984 |
| JP | 2711072 | 2/1998 |
| JP | 2005074438 | 3/2005 |
| JP | 2007054890 | 3/2007 |
| JP | 2007319910 | 12/2007 |
| JP | 2008194724 | 8/2008 |
| RU | 1593061 | 12/1994 |
| RU | 2281843 | 8/2006 |
| SU | 716753 | 2/1980 |

OTHER PUBLICATIONS

Roll Form Mill used to produce flux-cored welding wire. YouTube. Uploaded Aug. 25, 2009, from https://www.youtube.com/watch?v=-fbIO0_HNR0&t=31s.*

International Search Report from PCT application No. PCT/US2012/046399 datd Sep. 27, 2012, 16 pgs.

* cited by examiner

FLUX-CORED WELDING WIRE, THE METHOD FOR MANUFACTURING THE SAME AND USING OF THE SAME

CROSS REFERENCE TO RELATED APPLICATIONS

This application claims priority from and the benefit of PCT Application No. PCT/US2012/046399, filed on Jul. 12, 2012; and Chinese Patent CN 201110196187.3, filed on Jul. 13, 2011; entitled "A Flux-Cored Welding Wire, the Method for Manufacturing the Same and Using of the Same", which are herein incorporated by reference.

TECHNICAL FIELD

The present invention relates to a flux-cored welding wire, and particularly to a flux-cored welding wire for welding stainless steels, and more particularly to a flux-cored welding wire for welding 400 series of stainless steels. The present invention also relates to the method for manufacturing such flux-cored welding wire and using of it.

BACKGROUND

In the industrial manufacturing field, welding is a basic means of connecting components made of iron and steel materials. Compared with using a manual electrode and solid welding wire, a flux-cored welding wire has good technological property and is energy-efficient. Flux-cored welding wires are widely used for welding components which are made of various steel materials. The welding property of a flux-cored welding wire depends on the compositions of the shell and flux. Many of flux-cored welding wire manufacturers have been focused on the development and improvement of the compositions and formulations of the flux to improve the welding property of a flux-cored welding wire.

However, different steel materials have different material properties. Therefore, a flux-cored welding wire which is suitable for welding one kind of steel materials may not be suitable for welding another kind of steel materials. Moreover, the manufacturing process for a flux-cored welding wire is more complex than that for an electrode or solid welding wire. Particularly, the powders of various compositions in the flux of a flux-cored welding wire should be mixed uniformly and have a high density; otherwise, the quality of the flux-cored welding wire may suffer. Therefore, compared with the manufacture for an electrode or a solid welding wire, there is a higher requirement for manufacture machines to manufacture a flux-cored welding wire and the cost for manufacturing a flux-cored welding wire is higher.

SUMMARY OF THE INVENTION

The first aspect of the present invention is to provide a flux-cored welding wire comprises a shell enclosed to form a tubular or circular cavity therein that contains flux. The stainless steel that is used to made the shell contains 10%~18% of Cr by weight.

The flux-cored welding wire according to the first aspect is characterized in that, in the drawing process, the stretching ratio of the stainless steel that is used to make the shell can be selected at 20%, 25% or any value between the range of 20%-30%.

The flux-cored welding wire according to the first aspect is characterized in that the stainless steel that is used to make the shell contains no Ni or contains 5% or less than 5% of Ni by weight.

The flux-cored welding wire according to the first aspect is characterized in that the stainless steel for making the shell is any stainless steel in 400 series of stainless steels.

The flux-cored welding wire according to the first aspect is characterized in that the stainless steel that is used to make the shell is 409 or 410 type stainless steel.

The flux-cored welding wire according to the first aspect is characterized in that the flux contains 9%~68% of Cr, 1%~10% of Mn and 2%~15% of Si by weight and the balance is Fe.

The flux-cored welding wire according to the first aspect is characterized in that the weight of the flux is 5%~25% of that of the flux-cored welding wire or the filling ratio is 5%~25%, preferably 10%~20%.

The flux-cored welding wire according to the first aspect is characterized in that the deposited metal formed after welding process by using the flux-cored welding wire has 10%~20% of Cr, 0.1%~0.8% of Mn and 0.1%~1% of Si by weight of the deposited metal and the balance is Fe.

The flux-cored welding wire according to the first aspect is characterized in that the workpieces made of stainless steel that is to be welded by using the flux-cored welding wire contains 10%~18% of Cr by weight.

The flux-cored welding wire according to the first aspect is characterized in that the stainless steel for making the workpieces contains no nickel or contains less than 5% of nickel by weight.

The flux-cored welding wire according to the first aspect is characterized in that the stainless steel for making the workpieces is a stainless steel selected from the 400 series of stainless steels.

The flux-cored welding wire according to the first aspect is characterized in that the flux-cored welding wire is manufactured by drawing for multiple times or two times.

The flux-cored welding wire according to the first aspect is characterized in that the stretching ratio of the stainless steel that is used to make the shell can be selected at 20%, 25% or any value between the range of 20%-30%.

The second aspect of the present invention is to provide a flux-cored welding wire that comprises a shell enclosed to form a tubular or circular cavity that contains flux. The flux contains 9%~68% of Cr, 1%~10% of Mn and 2%~15% of Si by weight and the balance is Fe.

The flux-cored welding wire according to the second aspect is characterized in that the stainless steel that is used to make the shell contains 10%~18% of Cr by weight.

The flux-cored welding wire according to the second aspect is characterized in that, during the drawing process, the stretching ratio of the stainless steel that is used to make the shell can be selected at 20%, 25% or any value between the range of 20%-30%.

The flux-cored welding wire according to the second aspect is characterized in that the stainless steel that is used to make the shell contains no nickel or contains 5% or less than 5% of nickel by weight.

The flux-cored welding wire according to the second aspect is characterized in that the stainless steel for making the shell is any stainless steel in 400 series of stainless steels.

The flux-cored welding wire according to the second aspect is characterized in that the weight of the flux is 5%~25% of that of the flux-cored welding wire or the filling ratio is 5%~25%, preferably 10%~20%.

The flux-cored welding wire according to the second aspect is characterized in that the workpieces made of stainless steel that is to be welded by using the flux-cored welding wire contains 10%~18% of Cr by weight.

The flux-cored welding wire according to the second aspect is characterized in that the stainless steel for making the workpieces contains no nickel or contains less than 5% of nickel by weight.

The flux-cored welding wire according to the second aspect is characterized in that the stainless steel for making the workpieces is a stainless steel selected from the 400 series of stainless steels.

The flux-cored welding wire according to the second aspect is characterized in that the weight of the flux is between 5%~25% of that of the flux-cored welding wire or the filling ratio is between 5%~25%, preferably between 10%-20%.

The flux-cored welding wire according to the second aspect is characterized in that the flux-cored welding wire is manufactured by drawing for multiple times or two times.

The flux-cored welding wire according to the second aspect is characterized in that in the drawing process, the stretching ratio of the stainless steel that is used to make the shell can be selected at 20%, 25% or any value between the range of 20%-30%.

The third aspect of the present invention is to provide a method for manufacturing the flux-cored welding wire that is described in claims 1-25, the method comprises the steps of selecting the steel strip according to any one or combination of claims 1-25, wrapping the flux into the steel strip and forming the welding wire by drawing the steel strip for multiple times.

The fourth aspect of the present invention is to provide a method for using the flux-cored welding wire that is described in claims 1-25, the method comprises the steps of providing the flux-cored welding wire that is described in claims 1-25 and using the flux-cored welding wire that is described in claims 1-25 to weld the workpieces that is described in claims 1-26.

DESCRIPTION OF EMBODIMENTS

Stainless steel materials are widely used because they have good corrosion-resistant performance. For example, stainless steel materials are widely used in many fields, such as energy, petroleum, chemical, mechanism, building decoration, food machinery and medical instrument, etc. Stainless steels are classified into austenitic stainless steel, ferritic stainless steels, austenitic-ferritic stainless steels and martensitic stainless steels according to the compositions thereof. Austenitic stainless steels comprise more than 18% of chromium and more than 8% of nickel by weight, and small amounts of molybdenum, titanium and nitrogen, etc. Ferritic stainless steels comprise 12%~30% of chromium by weight, without or with only a trace amount of nickel. Martensitic stainless steels also do not contain nickel or only contain a trace amount of nickel. Austenitic-ferritic stainless steels are stainless steels consisting of austenite and ferrite. Stainless steels can also be classified into stainless steels with different series numbers, e.g., 200 series, 300 series, 400 series. Each of series of stainless steels comprises numerous subclasses. The 300 series mainly comprises austenitic stainless steels. The 400 series mainly comprises ferritic stainless steels and martensitic stainless steels.

Among different kinds of stainless steels, due to the impact from the increased nickel price as well as the requirements of industrial development, the production of austenitic stainless steels decreases in recent years while the productions of ferritic stainless steels, chromium-manganese austenitic stainless steels and duplex stainless steels have increased a great deal, and this trend is expected to continue. The main reason for such phenomenon is the global shortage of nickel, which is also the main reason for the stubbornly high price of austenitic stainless steels nowadays. Therefore, because of the unique advantage of ferritic stainless steels that they do not contain nickel or only contain a trace amount of nickel, the consumption of ferritic stainless steels has increased year by year, especially in the automobile field, the consumption percentage of the ferritic stainless steels becomes higher and higher.

There are three main kinds of ferritic stainless steels: the first kind comprises 409, 410 and 420 types of stainless steels containing 10%-14% of Cr by weight; the second kind comprises 430 type of stainless steel containing 14%-18% of Cr by weight; and the third kind comprises 430Ti and 439 types of stainless steels containing 14%-18% of Cr by weight as well as Ti, Nb, etc. These three kinds of ferritic stainless steels have different usages because they have different properties. The first kind of ferritic stainless steels are the cheapest because of having the lowest percentage of Cr therein and suitable to be used in environments where no corrosion occurs or slightly corrosion occurs or in environments where slightly local rust is allowed. The 409 type stainless steel of the first kind of ferritic stainless steels is mainly used in automotive exhaust systems while the 410 type stainless steel is often used in containers, buses and long distance coach cars and sometimes in frames of LCDs. The second kind of ferritic stainless steels (i.e. the 430 type of stainless steel which is usually most widely used) has a better corrosion-resistance performance because it comprises more chromium. The second kind of ferritic stainless steels is commonly used indoors, typically being used in the roller of a washing machine and indoor panels, etc. Most properties of the second kind of ferritic stainless steels are similar to those of the 304 type stainless steel so that the former may substitute for the latter in certain fields for manufacturing, for example, kitchen facilities, dishwashers, pots and pans, etc. The second kind of ferritic stainless steel has sufficient corrosion-resistance performance. The third kind of ferritic stainless steels has good welding property and formability. In most cases, the properties of the third kind of ferritic stainless steels are even better than those of the 304 type stainless steel. The third kind of ferritic stainless steels are typically used in water flumes, heat exchange pipes (in the sugar industry and energy field, etc.), automotive exhaust systems (having a longer life time than those made of the 409 type) and welding parts of washing machines. The third kind of ferritic stainless steels can even substitute the 304 type for using in those occasions which require better properties. The stainless steels above-described are defined in the ASTM standard and their compositions can be found in the ASTM standard.

Welding is the common means to connecting different components of a stainless steel product. In the applications described above, it is frequently to connect ferritic stainless steel workpieces together by welding, especially in the fields of automobile, pressure vessel and heat exchanger, etc. Welding is the most cost effective and efficient method for connecting metals. For example, welding process is frequently used to weld the 409 type stainless steel workpieces that are used in automotive exhaust emission systems.

The main welding materials for ferritic stainless steels include solid welding wires and flux-cored welding wires. Owing to the shortcomings of instable electric arc, large depth of fusion (which easily causes burn-through) and low welding efficiency, solid welding wires are gradually replaced by flux-cored welding wires. Therefore, especially in industrially developed countries, such as Europe, America and Japan, a flux-cored welding wire is a main selection for welding ferritic stainless steels. The shell of a welding wire for welding ferritic stainless steels is traditionally made of carbon steel.

Figure 1:
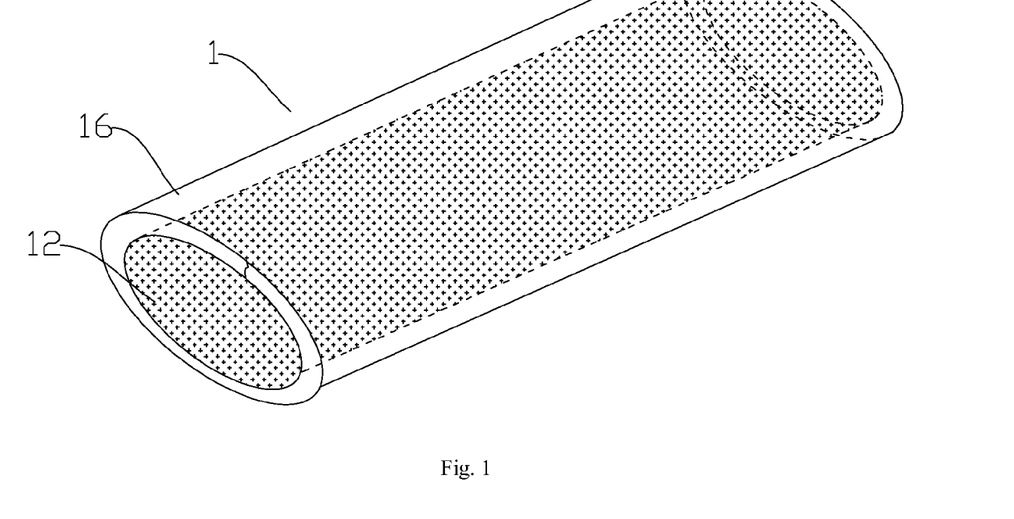
FIG. 1 is a schematic view showing the structure of a flux-cored welding wire according to the present invention.
Figure 5:
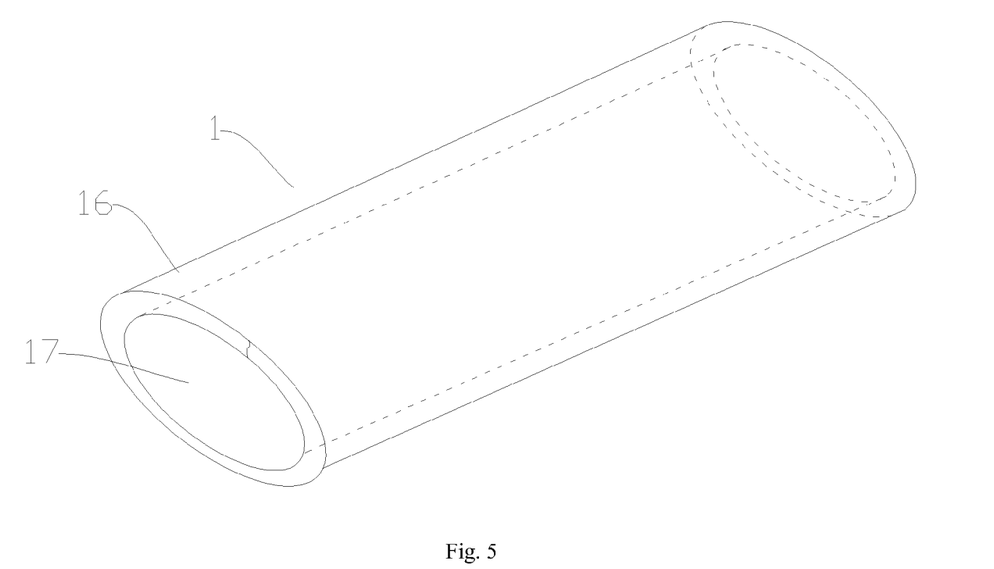
FIG. 5 is a schematic view showing the cavity of the flux-cored welding wire after the flux is removed from welding wire.

In order to better understand the present invention, detailed descriptions will be given hereinafter with references to the accompanying drawings and embodiments:

FIG. 1 is a schematic view showing the structure of the flux-cored welding wire 1 of the present invention. As shown in FIG. 1, the flux-cored welding wire 1 comprises a shell 16. The shell 16 is in tubular (or circular) shape and has a tubular (or circular) cavity 17 therein (as shown in FIG. 5), which contains flux 12 along its axial direction. In one embodiment, the welding wire 1 can be shaped to have a diameter of 1.4 mm, but other diameters are possible according to practical usages and requirements. For example, based on usages, the diameter of the flux-cored welding wire 1 can be 1.2 mm or 1.6 mm.

Figure 2:
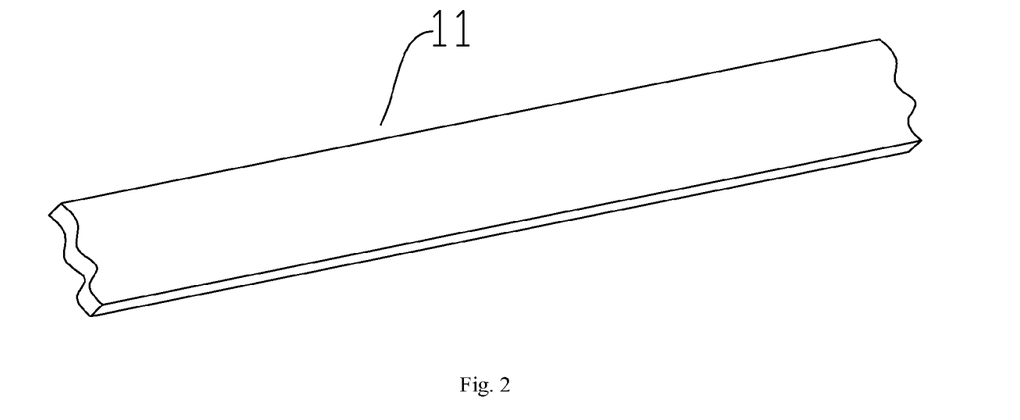
FIG. 2 is a schematic view of the stainless steel strip for making the flux-cored welding wire of the present invention.

FIG. 2 shows a steel strip 11 for manufacturing the flux-cored welding wire 1 of the present invention, which can be used to weld 400 type stainless steels (including, but not limited to 409, 410, 420, 430, 430Ti and 439). In the present invention, the steel strip 11 can be made of a 400 type stainless steel (including, but not limited to, 409, 410, 420, 430, 430Ti and 439).

Figure 3:
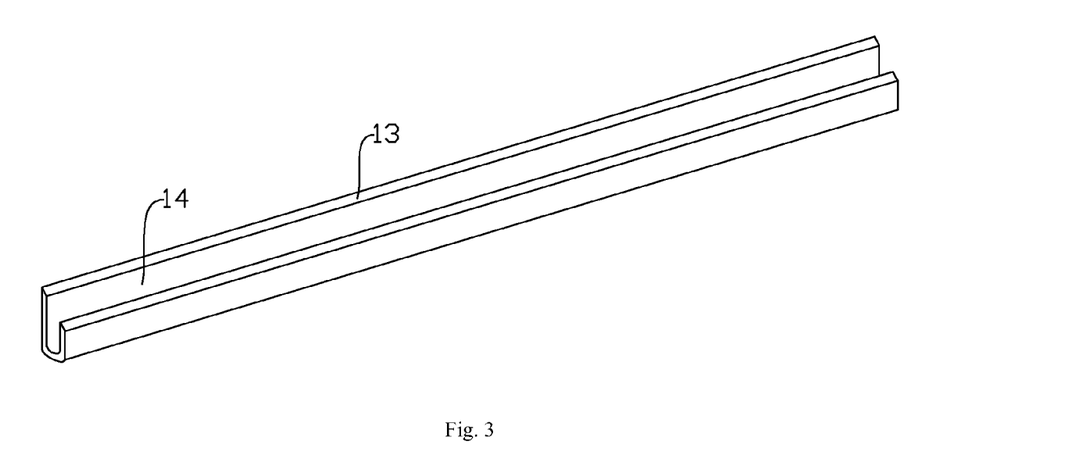
FIG. 3 is a schematic view of the stainless steel strip, which is shaped as U shape with an opening in the top.

As shown in FIG. 3, in order to wrap the flux into the welding wire 1 in the manufacturing process, the steel strip 11 is initially shaped into U-shape to form a U-shaped groove 14 with an opening 13, through which the flux can be put into the U-shaped groove 14.

Figure 4:
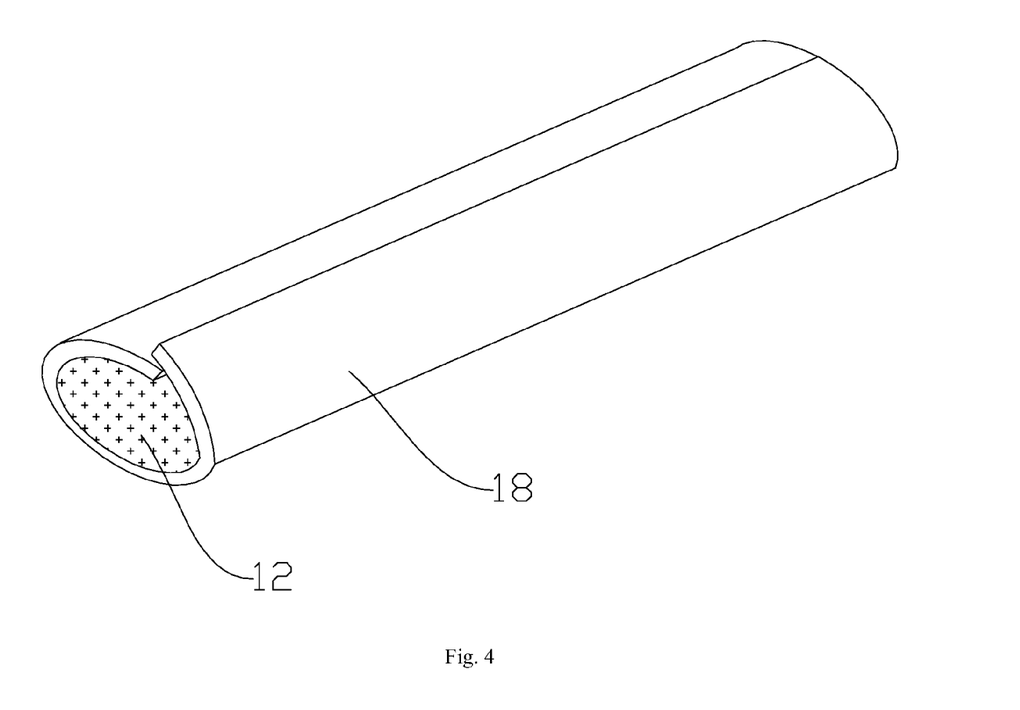
FIG. 4 is a schematic view showing the structure of the U-shaped stainless steel stripe when its opening is enclosed.

As shown in FIG. 4, in the manufacturing process, the U-shaped groove 14 of the steel strip 11 is enclosed by overlapping the two edges of the U-shaped groove 14 so that the steel strip 11 is wrapped into a round-shaped strip 18 to form the tubular (or circular) cavity 17 therein. The flux 12 is wrapped within the round-shaped strip 18. The round-shaped steel strip 18 is then drawn by a drawing machine or drawing machines for multiple times (including two times, three times or more). In the manufacturing process, the round-shaped steel strip 18 is usually drawn for two times so that the round-shaped steel strip 18 becomes tubular-shaped (or circular-shaped) shell 16, within which the flux 12 is wrapped. After being drawn multiple times, the round-shaped steel strip 18 is drawn into a tubular-shaped (or circular-shaped) flux-cored welding wire 1 as shown in FIG. 1. In the drawing process, to avoid being broken and improve yield, the stretching ratio of the steel strip 11 made of 400 series stainless steels should be selected within the range of 20%-30%. The wording "stretching ratio" here means the ratio between the extended length by stretching and the original length of the strip. Therefore, that is to say, in the drawing process, the ratio of the extended length by stretching and the original length of the steel strip 11 should be controlled within the range of 20%-30%.

FIG. 5 shows a tubular (or circular) cavity 17 that is formed inside the shell 16 along the axial direction of the welding wire 1 if the flux 12 were removed from the welding wire 1. The flux 12 is uniformly distributed in the tubular (or circular) cavity 17 of the welding wire along the axial direction of the welding wire 1.

Figure 6:
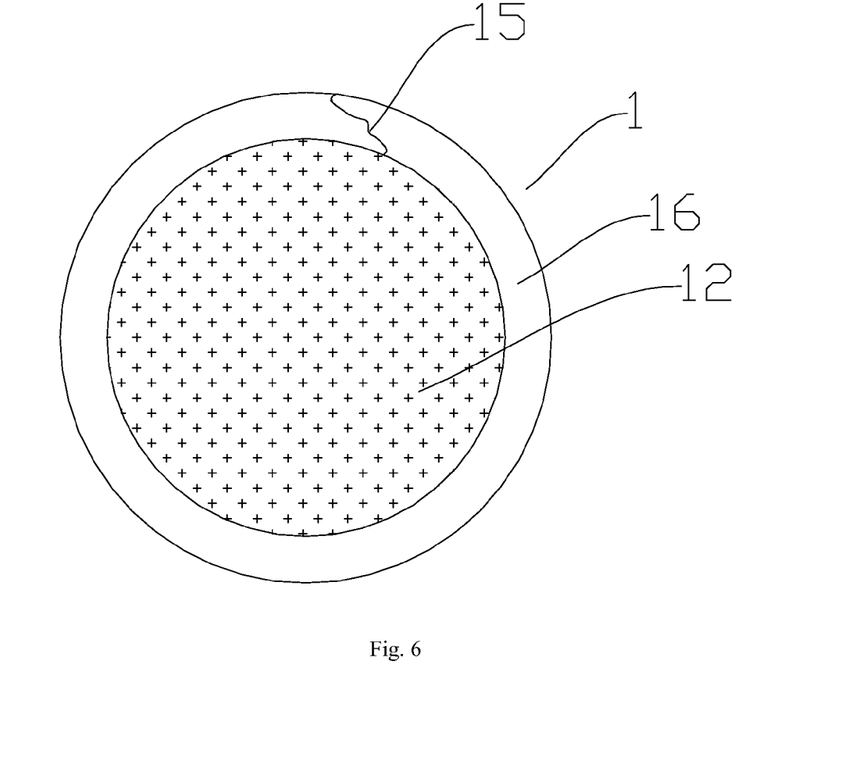
FIG. 6 is a sectional view of the flux-cored welding wire (the flux is removed) of the present invention.

FIG. 6 is a schematic view showing the cross-section of the flux-cored welding wire after the flux-cored welding wire is drawn by a drawing machine. The flux 12 is wrapped inside the flux-cored welding wire 1 by the shell 16. As shown in FIG. 6, the cross-section of the welding wire 1 shows a lap joint section 15 on the shell 16, which is formed by overlapping the two edges of the steel strip 11.

To weld workpieces made of different materials, the compositions of the shell and flux of the welding wire should meet certain requirements. For example, the material of the shell should meet the requirement for tensile strength to facilitate manufacture. In addition, to meet amount requirements for the different compositions of deposited metals in the welding process, the percentages of compositions in the shell or flux or combination thereof should be controlled. For example, if the deposited metal is required to be corrosion-resistant, the deposited metal should contain more than 13% of chromium to satisfy most basic requirement for corrosion-resistant property.

After analyzing, the inventors found that carbon steel and 300 series of stainless steels all have good stretch performance. The stretching ratio for 300 series of stainless steels is larger than 40% and that for the carbon steel is larger than 36. Under the same testing condition, the stretching ratio of 400 series of stainless steels is within the range of 20%-30%. Therefore, even if the high end of the stretching ratio for 400 series of stainless steels and the lower end of the stretching ratio for 300 series of stainless steels were selected, the stretching ratio of 300 series of stainless steels is at least 1.3 times as that of 400 series of stainless steels and the stretching ratio of carbon stainless steel is at least 1.2 times as that of 400 series of stainless steels. However, when actually selecting a steel material for manufacturing a flux-cored welding wire, a manufacturer always selects a particular steel material have a stretching ratio that exceeds the low end for the selected steel material. For example, in actual manufacturing process, the manufacture may select a particular carbon steel having a stretching ratio of 40%, or may select a particular 300 stainless steel having a stretching ratio of 45%. Therefore, in actual manufacturing process, a manufacture may select a particular carbon steel or a particular 300 stainless steel with a stretching ratio is much larger than that of 400 series of stainless steels. Therefore, traditionally, a person skilled in the industry deems 400 series of stainless steels not suitable to make flux-cored welding wires due to their poor stretch performance. The stretch performance of 400 series of stainless steels are jointly determined by compositions, percentages of the compositions, heating process in smelting production and metallographic structure of the 400 series of stainless steels.

The percentages of the compositions by weight contained in regularly used 400 series of stainless steels are as follows:

| Steel grade | C | Si | Mn | P | S | Ni | Cr | Ti | Fe |
|---|---|---|---|---|---|---|---|---|---|
| 409 | ≤0.08 | ≤1.0 | ≤1.0 | ≤0.045 | ≤0.03 | 0 | 10.5~11.75 | 6 * C~0.75 | Balance |
| 410 | ≤0.15 | ≤1.0 | ≤1.0 | ≤0.040 | ≤0.03 | ≤0.75 | 11.5~13.5 | 0 | Balance |

(The percentage range of "6*C-0.75" of Ti in the above table means the minimum percentage of Ti in 409 stainless steel is equal to the value of "6" multiplying the percentage of C and the maximum percentage of Ti in 409 stainless steel is 0.75.)

After analyzing, the inventors also found that 300 series of stainless steels contain more than 18% of chromium by weight while 400 series of stainless steels contain 10%-18% of chromium by weight. In addition, 300 series of stainless steels contain more than 8% of nickel while 400 series of stainless steels contain less than 5% of nickel by weight or contain no nickel. When using 300 series of stainless steels to a make flux-cored welding wire, the nickel in the shell of the welding wire will be transferred to the deposited metal in welding process. Under the condition of filling ratio being 30%, more than 5.6% of nickel in the deposited metal is transferred from the shell of the flux-cored welding wire. When the deposited metal contains too much nickel, the flux-cored welding wire is not suitable for welding workpieces made from 400 series of stainless steels. This is so because 400 series of stainless steels contain small percentage of nickel or contain no nickel and too much nickel in the deposited metal makes the compositions of the deposited metal different from or not similar to those in the workpieces. Such a difference or non-similarity between the deposited metal and workpieces not only has negative impact on the welding performance of the flux, but also cause waste of nickel because 400 series of stainless steels do not need to contain too much nickel. In addition, 300 series of stainless steels contain more than 18% of chromium by weight. Therefore, when using the flux-cored welding wire made from 300 series of stainless steels to weld workpieces made from 400 series of stainless steel, the deposited metal will contain more than 18% of chromium by weight, thus causing waste of chromium.

The shell of the flux-cored welding wire for welding 400 series of stainless steels has been made of carbon steel for long time because carbon steel has good stretching performance with stretching ratio being higher than 36%. According to statistical data, carbon steels have been used to make flux-cored welding wires for at least 30 years. After analyzing, the inventors found that carbon steel contains small amount of carbon, silicon and manganese but does not contain chromium. In order to meet the corrosion-resistant requirement for the deposited metal formed after the welding using a flux-cored welding wire having a carbon steel shell, enough chromium should be added into the flux to make the deposited metal have more than 13% of chromium by weight. When using welding wire with carbon steel shell in welding process, if the deposited metal is required to have a certain amount of chromium in percentage, such a requirement can be achieved by controlling/adjusting the percentage of chromium and the filling ratio of the welding wire. The filling ratio of a flux-cored welding wire is defined as a ratio between the weight of the flux in the welding wire per unit length and the weight of the welding wire per unit length. Therefore, if the deposited metal is required to have a certain amount of chromium in percentage, when the filling ratio is small, the percentage of chromium should be large in the flux; when the percentage of chromium in the flux is small, the filling ratio should be large. For example, if the deposited metal is required to have more than 13% of chromium, when the filling ratio is 15%, the percentage of chromium in the flux should be at least 86%; even when the filling ratio reaches 30%, the percentage of chromium in the flux should be higher than 43%. Under a filling ratio, if the percentage of chromium is high in the flux, the percentages of other compositions in the flux have to be low.

The filling ratio of the flux-cored welding wire with a carbon steel shell should reach 20%~30% to ensure that the percentage of the chromium in the flux is not too high which may cause the percentages of other compositions in the flux too low to meet the minimum percentage requirements for them. However, when the diameter of a flux-cored welding wire is a fixed value, the higher the filling ratio is, the higher the percentage of the flux relative to the welding wire is and the thinner the shell is. When the filling ratio of the flux-cored welding wire with a carbon steel shell exceeds 20%, the thickness of the shell can be reduced to be less than 0.25 mm. During drawing process (particularly in multi-time drawing process), shell with small thickness is subject to increased possibility of being broken. Even with a required stretching rate of 120%, the shell with a thickness of smaller than 0.25 mm has increased probability of being broken in drawing process. In standardized production, flux-cored welding wires in different production batches shall have same length. The broken welding wires need to be reconnected by welding. However, the shells of reconnected welding wires are easier broken during subsequent drawing process. For this reason, once the shell of a flux-cored welding wire is broken in the drawing process, the production process is interrupted and the yield and production efficiency is reduced, which can cause a lot of waste.

If filling ratio was reduced to prevent the carbon steel shell from being broken in drawing process, the percentage of the chromium in the flux has to be increased to make the chromium in the deposited metal meet the percentage requirement. As a result, the percentages of other compositions in the flux have to be reduced, which may cause the problem that the other compositions in the deposited metal cannot meet the minimum percentage requirements for them. Therefore, when using carbon steel as the shell for welding wires, to ensure the percentage of chromium in deposited metal to meet the percentage requirement, the solution is either to reduce the percentage of other compositions (which may be not acceptable by the percentage requirements for the compositions in the deposited metal) or to reduce the thickness of the shell (which may cause problem in drawing process). Therefore, using s carbon steel to make shells brings problems which cannot be solved.

Compared with the flux-cored welding wire of the present invention, another drawback of the flux-cored welding wire with a carbon steel shell is that it may easily get rusty. Therefore, when using the flux-cored welding wire with a carbon steel shell in the welding process, although the deposited metal formed after the welding is corrosion-resistant, the carbon steel shell itself does not have corrosion-resistant performance. In storage, the carbon steel shell may get rusty after being exposed to the air for certain period of time (about two weeks for example). The rusty flux-cored welding wire can hardly meet the requirements for normal use. It is undoubtedly that the flux-cored welding wire with a carbon steel shell has the drawbacks of short storage time, high requirements for storage environment and high use cost, which cannot be overlooked.

Furthermore, compared with the flux-cored welding wire of the present invention, the third drawback of the flux-cored welding wire with a carbon steel shell is the high loss (which is as high as 5%) of chromium during the transition to the deposited metal in the welding process.

When using the flux-cored welding wire of the present invention in the welding process, the chemical compositions are more evenly distributed in the deposited metal formed in the welding process. The loss of chromium during the transition to the deposited metal is lower than 0.1%, thus saving recourses and reducing welding costs. The filling ratio of the flux-cored welding wire of the present invention can be 5%-25% (preferably 10%-20%), which can not only increase the stability of the compositions in the flux, but also avoid the disadvantages to the manufacturing process caused by the high filling ratio and thin shell. The flux-cored welding wire of the present invention will not get rusty even though it is exposed to the air for a long time. Therefore, it has lower requirements for storage conditions and longer storage time, thus reducing manufacturing cost.

One of the embodiments in the present invention uses 410 stainless steel as the shell of welding wire, which contains the compositions as shown in Table 1.

TABLE 1

The percentages of the compositions in the selected 410 stainless steel strip (percentage by weight)

| ASTM 410 | C | Si | Mn | P | S | Ni | Cr | Fe | Hardness (HV) | Tensile strength (Mpa) | Yield strength (Mpa) | Stretching ratio (%) |
|---|---|---|---|---|---|---|---|---|---|---|---|---|
|  | 0.08~0.15 | 1.00 | 1.00 | 0.040 | 0.030 | 0.75 | 11.8 | Balance | ≤210 | ≥450 | ≥205 | 20-25 |

In one of the embodiments in the present invention, the flux formula of the flux is shown in Table 2, in which the shell of the welding wire is made from 410 stainless steels.

TABLE 2

The formulas of the fluxes in welding wires (percentages by weight)

| Steel grade of the workpieces to be welded | Embodiments | Cr | Ni | Mo | Mn | Si | Ti | Nb | TiO$_2$ | SiO$_2$ | Fe | 填充比 |
|---|---|---|---|---|---|---|---|---|---|---|---|---|
| 409 | 1 | 12 |  |  | 4.8 | 15 | 13 |  |  |  | Balance | 9 |
|  | 2 | 18 |  |  | 3 | 12 | 15 |  |  |  |  | 15 |
|  | 3 | 15 |  |  | 6.5 | 15 | 18 |  |  |  |  | 11 |
|  | 4 | 11 |  |  | 3.5 | 9 | 9 |  |  |  |  | 12 |
|  | 5 | 10 |  |  | 3.5 | 11 | 12 |  |  |  |  | 16 |
|  | 6 | 20 |  |  | 4.8 | 13 | 17 |  |  |  |  | 19 |
|  | 7 | 15 |  |  | 2 | 14 | 10 |  |  |  |  | 11 |
| 410 | 8 | 13.5 |  |  | 3.8 | 13 |  |  |  |  |  | 10 |
|  | 9 | 17.5 |  |  | 3 | 9.5 |  |  |  |  |  | 16 |
|  | 10 | 14 |  |  | 5.7 | 13.8 |  |  |  |  |  | 15 |
|  | 11 | 12 |  |  | 4.2 | 8 |  |  |  |  |  | 12 |
|  | 12 | 16 |  |  | 5.5 | 5.3 |  |  |  |  |  | 14 |
| 410NiMo | 13 | 15 | 25 | 6 | 5 | 2 |  |  | 20 | 11 |  | 20 |
|  | 14 | 18 | 12 | 3.5 | 3 | 5 |  |  | 30 | 9 |  | 18 |
|  | 15 | 15 | 11 | 5 | 5 | 10 |  |  | 15 | 12 |  | 22 |
|  | 16 | 12 | 18 | 5.5 | 8 | 6 |  |  | 28 | 13 |  | 15 |
|  | 17 | 11 | 22 | 4.3 | 5 | 3 |  |  | 21 | 11 |  | 22 |
|  | 18 | 20 | 17 | 3.2 | 9 | 5 |  |  | 16 | 16 |  | 13 |
|  | 19 | 18 | 16 | 6.7 | 2 | 9 |  |  | 10 | 13 |  | 25 |
| 430 | 20 | 38 |  |  | 10 | 9 |  | 6 |  |  |  | 18 |
|  | 21 | 30 |  |  | 6 | 10 |  | 3.5 |  |  |  | 26 |
|  | 22 | 35 |  |  | 9 | 6 |  | 2.8 |  |  |  | 22 |
|  | 23 | 36 |  |  | 12 | 4 |  | 6 |  |  |  | 18 |
|  | 24 | 40 |  |  | 11 | 8 |  | 4 |  |  |  | 11 |
|  | 25 | 36 |  |  | 8 | 5 |  | 3.5 |  |  |  | 20 |
|  | 26 | 42 |  |  | 5 | 10 |  | 6 |  |  |  | 20 |
| 439 | 27 | 45 |  |  | 5 | 3.8 | 6 |  |  |  |  | 20 |
|  | 28 | 68 |  |  | 9 | 4.5 | 3.5 |  |  |  |  | 18 |
|  | 29 | 55 |  |  | 5.5 | 8 | 2.8 |  |  |  |  | 19 |
|  | 30 | 42 |  |  | 4.8 | 6.2 | 5.5 |  |  |  |  | 13 |
|  | 31 | 66 |  |  | 3.2 | 5.9 | 5 |  |  |  |  | 15 |
|  | 32 | 52 |  |  | 6 | 7.5 | 6 |  |  |  |  | 10 |
|  | 33 | 60 |  |  | 9 | 5 | 8 |  |  |  |  | 15 |

The percentages of compositions in the deposited metals which are formed after the welding wires in Table 2 are used to welding corresponding stainless steel workpieces are shown in Table 3.

TABLE 3

The percentages of compositions in the deposited metals (percentages by weight)

| Steel grade of the workpieces to be welded | Embodiments | C | Cr | Ni | Mo | Mn | Si | Ti | Nb | Fe |
|---|---|---|---|---|---|---|---|---|---|---|
| 409 | 1 | 0.032 | 11.1 | 0.009 | 0.032 | 0.51 | 0.44 | 0.8 | | Balance |
| | 2 | 0.033 | 12.0 | 0.012 | 0.022 | 0.38 | 0.56 | 0.75 | | |
| | 3 | 0.042 | 11.4 | 0.008 | 0.028 | 0.42 | 0.31 | 1.03 | | |
| | 4 | 0.035 | 11.0 | 0.006 | 0.015 | 0.39 | 0.29 | 0.64 | | |
| | 5 | 0.044 | 10.8 | 0.009 | 0.026 | 0.45 | 0.35 | 0.59 | | |
| | 6 | 0.053 | 12.6 | 0.01 | 0.033 | 0.52 | 0.49 | 0.93 | | |
| | 7 | 0.033 | 11.4 | 0.011 | 0.027 | 0.44 | 0.52 | 0.87 | | |
| 410 | 8 | 0.046 | 11.87 | 0.61 | 0.024 | 0.68 | 0.55 | | | |
| | 9 | 0.051 | 13.3 | 0.40 | 0.018 | 0.70 | 0.47 | | | |
| | 10 | 0.039 | 12.64 | 0.46 | 0.030 | 0.66 | 0.40 | | | |
| | 11 | 0.066 | 12.0 | 0.52 | 0.015 | 0.75 | 0.62 | | | |
| | 12 | 0.058 | 12.80 | 0.60 | 0.028 | 0.73 | 0.74 | | | |
| 410NiMo | 13 | 0.046 | 11.7 | 4.8 | 0.68 | 0.58 | 0.35 | | | |
| | 14 | 0.051 | 12.1 | 4.4 | 0.54 | 0.49 | 0.29 | | | |
| | 15 | 0.039 | 11.8 | 4.8 | 0.61 | 0.42 | 0.32 | | | |
| | 16 | 0.066 | 11.5 | 4.8 | 0.52 | 0.55 | 0.55 | | | |
| | 17 | 0.058 | 11.0 | 4.5 | 0.57 | 0.49 | 0.61 | | | |
| | 18 | 0.058 | 12.1 | 4.2 | 0.49 | 0.58 | 0.47 | | | |
| | 19 | 0.062 | 12.6 | 4.7 | 0.55 | 0.37 | 0.31 | | | |
| 430 | 20 | 0.051 | 15.5 | 0.005 | 0.033 | 0.33 | 0.27 | | 0.66 | |
| | 21 | 0.062 | 15.5 | 0.003 | 0.024 | 0.56 | 0.36 | | 0.78 | |
| | 22 | 0.053 | 15.9 | 0.002 | 0.031 | 0.28 | 0.48 | | 0.59 | |
| | 23 | 0.034 | 15.2 | 0.007 | 0.026 | 0.49 | 0.45 | | 0.42 | |
| | 24 | 0.029 | 14.0 | 0.006 | 0.038 | 0.38 | 0.3 | | 0.94 | |
| | 25 | 0.041 | 15.6 | 0.002 | 0.051 | 0.32 | 0.28 | | 0.65 | |
| | 26 | 0.037 | 16.8 | 0.008 | 0.037 | 0.55 | 0.39 | | 0.88 | |
| 439 | 27 | 0.019 | 17.3 | 0.006 | 0.027 | 0.41 | 0.59 | 0.66 | | |
| | 28 | 0.03 | 18.9 | 0.009 | 0.031 | 0.36 | 0.62 | 0.53 | | |
| | 29 | 0.027 | 18.8 | 0.008 | 0.031 | 0.53 | 0.48 | 0.79 | | |
| | 30 | 0.031 | 17.2 | 0.009 | 0.035 | 0.33 | 0.37 | 0.78 | | |
| | 31 | 0.035 | 18.7 | 0.01 | 0.028 | 0.42 | 0.54 | 0.46 | | |
| | 32 | 0.022 | 17.0 | 0.007 | 0.039 | 0.51 | 0.28 | 0.57 | | |
| | 33 | 0.018 | 17.9 | 0.008 | 0.028 | 0.62 | 0.33 | 0.83 | | |

The various stainless steels described above are defined in ASTM standard.

To better illustrate the present invention, the comparisons between the mechanical parameters of 410 stainless steel strip and carbon steel strip are listed as follows:

TABLE 4

The exemplary mechanical parameters of 410 stainless steel strip and carbon steel strip

| | Hardmenss (HRB) | Tensile strength (Mpa) | Yield strength (Mpa) | Stretching ratio (%) |
|---|---|---|---|---|
| 410 stainless steel | 90 | 450 | 205 | 20 |
| Carbon steel | 66 | 357 | 262 | 42 |

The above listed mechanical parameters show that, compared with the 410 stainless steel, carbon steel has better processability, which better fits the multiple drawing process in the manufacturing process of flux-cored welding wire. Therefore conventionally, better processability is one of the major reasons to select carbon steel to made the shell of a flux-cored welding wire.

In the conventional production process, however, when manufacturing the flux-cored welding wire for welding 400 series of stainless steels, if carbon steel is used to make the shell of the flux-cored welding wire, in order to form required deposited metal (to meet the requirements for corrosion resistance) at the welding beads, a large amount of flux powders needs to be filled in the shell, which increases the filling ratio of the flux-cored welding wire. As a result, the carbon steel shell has to be very thin, which offsets the better processibilty of the carbon steel and makes it difficult to manufacture flux-cored welding wires. This is because as the filling ratio increases, the thickness of the carbon steel shell reduces to a certain value (e.g., 0.25 mm). When the steel strip is too thin, it will be easily broken during drawing process. Therefore, when manufacturing the flux-cored welding wire for welding 400 series of stainless steel workpieces, carbon steel strip is more frequently broken during the twice-drawing process, which causes substantial losses, reduces productivity, and increases manufacturing costs. When using 400 series of stainless steel to manufacture welding wire for the workpieces made from 400 series of stainless steel, due to the smaller filling ratio, the thickness of the shell can reach 0.3 mm, thus being more suitable to be drawn multi times without being broken in the drawing process, especially when the stretching ratio is controlled within the range of 20%-30%, particularly at 20% or 25% (after experiment and observation).

TABLE 5

The percentages of the main compositions in the selected 409 stainless steel (percentage by weight)

| ASTM 409 | C | Si | Mn | P | S | Ti | Cr | Fe | Hardness (HV) | Tensile strength (Mpa) | Yield strength (Mpa) | Stretching ratio (%) |
|---|---|---|---|---|---|---|---|---|---|---|---|---|
| | 0.08 | 0.8 | 0.6 | 0.02 | 0.015 | 6 * C | 10.6 | Balance | ≤175 | ≥360 | ≥175 | 25-30 |

(The percentage of "6*C" of Ti in the above table means the percentage of Ti is equal to the value of "6" multiplying the percentage of C.)

Using 409 stainless steel as the shell of the flux-cored welding wire, the formulas of the fluxes in various embodiments are shown in Table 6.

TABLE 6

The formulas of the fluxes in various welding wires having shells made from 409 stainless steel (percentages by weight)

| Steel grade of the workpieces to be welded | Embodiments | Cr | Ni | Mo | Mn | Si | Ti | Nb | TiO$_2$ | SiO$_2$ | Fe | Filing ratio |
|---|---|---|---|---|---|---|---|---|---|---|---|---|
| 409 | 34 | 13 | | | 5.2 | 11 | 17 | | | | Balance | 12 |
| | 35 | 15 | | | 5.5 | 12 | 12 | | | | | 14 |
| | 36 | 15 | | | 4.8 | 11 | 11 | | | | | 14 |
| | 37 | 12 | | | 4.5 | 9 | 19 | | | | | 12 |
| | 38 | 11 | | | 5.6 | 11 | 15 | | | | | 13 |
| | 39 | 16 | | | 4.7 | 15 | 11 | | | | | 17 |
| | 40 | 12 | | | 3.8 | 14 | 13 | | | | | 13 |
| 410 | 41 | 15 | | | 5.2 | 11 | | | | | | 15 |
| | 42 | 16 | | | 5.5 | 12 | | | | | | 16 |
| | 43 | 18 | | | 4.8 | 11 | | | | | | 14 |
| | 44 | 14 | | | 4.5 | 9 | | | | | | 13 |
| | 45 | 16 | | | 5.6 | 11 | | | | | | 19 |
| 410NiMo | 46 | 12 | 22 | 5.5 | 6 | 3 | | | 25 | 10 | | 22 |
| | 47 | 15 | 18 | 4 | 5 | 7 | | | 28 | 9.5 | | 17 |
| | 48 | 18 | 15 | 4.5 | 5 | 8 | | | 18 | 15 | | 20 |
| | 49 | 13 | 18 | 5.5 | 7 | 10 | | | 30 | 11 | | 18 |
| | 50 | 15 | 21 | 4 | 4 | 5 | | | 22 | 16 | | 15 |
| | 51 | 19 | 16 | 3.5 | 6 | 4 | | | 17 | 15 | | 19 |
| | 52 | 11 | 11 | 5.8 | 7 | 10 | | | 12 | 12 | | 22 |
| 430 | 53 | 35 | | | 8 | 8 | | 5 | | | | 12 |
| | 54 | 37 | | | 6 | 8 | | 5.5 | | | | 15 |
| | 55 | 20 | | | 5 | 10 | | 3.5 | | | | 19 |
| | 56 | 36 | | | 12 | 5 | | 8 | | | | 18 |
| | 57 | 38 | | | 10 | 8 | | 4.5 | | | | 13 |
| | 58 | 33 | | | 8 | 6 | | 3.5 | | | | 15 |
| | 59 | 42 | | | 9 | 12 | | 8 | | | | 20 |
| 439 | 60 | 44 | | | 6 | 4.2 | 5.5 | | | | | 18 |
| | 61 | 65 | | | 8 | 5 | 6 | | | | | 20 |
| | 62 | 55 | | | 6.5 | 6.8 | 3.5 | | | | | 19 |
| | 63 | 40 | | | 5.5 | 6.2 | 5.5 | | | | | 15 |
| | 64 | 66 | | | 3.2 | 5.5 | 6 | | | | | 13 |
| | 65 | 58 | | | 10 | 6.8 | 8 | | | | | 12 |
| | 66 | 60 | | | 9 | 8 | 7 | | | | | 15 |

The percentages of the compositions in the deposited metals which are formed after the welding wires shown in Table 6 are used to weld their corresponding stainless steel workpieces are shown in Table 7.

TABLE 7

The percentages of compositions in the deposited metals (percentages by weight)

| Steel grade of the workpieces to be welded | Embodiments | C | Cr | Ni | Mo | Mn | Si | Ti | Nb | Fe |
|---|---|---|---|---|---|---|---|---|---|---|
| 409 | 34 | 0.035 | 10.98 | 0.009 | 0.028 | 0.55 | 0.42 | 1.21 | | Balance |
| | 35 | 0.032 | 11.23 | 0.01 | 0.032 | 0.43 | 0.39 | 1.15 | | |
| | 36 | 0.041 | 11.23 | 0.007 | 0.025 | 0.41 | 0.35 | 0.96 | | |

TABLE 7-continued

The percentages of compositions in the deposited metals (percentages by weight)

| Steel grade of the workpieces to be welded | Embodiments | C | Cr | Ni | Mo | Mn | Si | Ti | Nb | Fe |
|---|---|---|---|---|---|---|---|---|---|---|
| | 37 | 0.036 | 10.87 | 0.005 | 0.02 | 0.52 | 0.25 | 0.68 | | |
| | 38 | 0.042 | 10.75 | 0.012 | 0.027 | 0.46 | 0.45 | 0.57 | | |
| | 39 | 0.051 | 11.45 | 0.01 | 0.033 | 0.44 | 0.41 | 1.1 | | |
| | 40 | 0.038 | 10.87 | 0.007 | 0.033 | 0.45 | 0.53 | 0.95 | | |
| 410 | 41 | 0.030 | 11.18 | 0.01 | 0.020 | 0.58 | 0.62 | | | |
| | 42 | 0.038 | 11.50 | 0.009 | 0.022 | 0.60 | 0.47 | | | |
| | 43 | 0.044 | 11.65 | 0.008 | 0.024 | 0.46 | 0.43 | | | |
| | 44 | 0.034 | 10.78 | 0.005 | 0.023 | 0.50 | 0.25 | | | |
| | 45 | 0.041 | 11.98 | 0.012 | 0.025 | 0.48 | 0.45 | | | |
| 410NiMo | 46 | 0.045 | 11.00 | 4.5 | 0.65 | 0.61 | 0.38 | | | |
| | 47 | 0.053 | 11.30 | 4.5 | 0.55 | 0.52 | 0.36 | | | |
| | 48 | 0.046 | 12.20 | 5 | 0.62 | 0.39 | 0.35 | | | |
| | 49 | 0.068 | 11.00 | 5.2 | 0.52 | 0.28 | 0.54 | | | |
| | 50 | 0.055 | 11.25 | 4.5 | 0.059 | 0.47 | 0.62 | | | |
| | 51 | 0.042 | 12.00 | 4.2 | 0.49 | 0.55 | 0.45 | | | |
| | 52 | 0.061 | 11.20 | 4.3 | 0.56 | 0.39 | 0.36 | | | |
| 430 | 53 | 0.055 | 15.60 | 0.005 | 0.032 | 0.36 | 0.35 | | 0.68 | |
| | 54 | 0.063 | 15.80 | 0.004 | 0.028 | 0.55 | 0.32 | | 0.91 | |
| | 55 | 0.053 | 17.20 | 0.002 | 0.031 | 0.29 | 0.46 | | 0.45 | |
| | 56 | 0.035 | 16.50 | 0.008 | 0.025 | 0.61 | 0.5 | | 0.49 | |
| | 57 | 0.035 | 15.50 | 0.012 | 0.033 | 0.29 | 0.36 | | 0.95 | |
| | 58 | 0.041 | 17.30 | 0.009 | 0.045 | 0.33 | 0.39 | | 0.66 | |
| | 59 | 0.038 | 16.08 | 0.007 | 0.026 | 0.51 | 0.51 | | 0.74 | |
| 439 | 60 | 0.021 | 18.20 | 0.012 | 0.036 | 0.45 | 0.45 | 0.63 | | |
| | 61 | 0.033 | 20.10 | 0.006 | 0.033 | 0.38 | 0.55 | 0.59 | | |
| | 62 | 0.025 | 17.98 | 0.014 | 0.021 | 0.35 | 0.45 | 0.82 | | |
| | 63 | 0.031 | 17.50 | 0.009 | 0.029 | 0.32 | 0.39 | 0.75 | | |
| | 64 | 0.035 | 17.00 | 0.008 | 0.028 | 0.46 | 0.52 | 0.64 | | |
| | 65 | 0.026 | 18.30 | 0.007 | 0.041 | 0.58 | 0.34 | 0.62 | | |
| | 66 | 0.022 | 17.15 | 0.009 | 0.025 | 0.61 | 0.33 | 0.89 | | |

Based on analysis, research and testing, the inventors found that, because 400 series of stainless steels contain suitable percentage of chromium, when using the welding wire made of any type of the 400 series of stainless steel to weld the workpieces also made of 400 series of stainless steels, in the multi (including two times, three times or more) drawing process, the welding wire that uses the above flux formulas in Table 2 and Table 6 can achieve the following results, especially when the stretching ratio is controlled within the range of 20%-30%, particularly at 20% or 25%:

1. The deposited metal of the present invention contains 10%-18% of Cr by weight, which is similar to the percentage of the Cr in the 400 series stainless steel workpieces to be welded. Therefore, the corrosion-resistance performance of the deposited metal of the present invention and the 400 series stainless steel workpieces to be welded are similar and the flux-cored welding wire of the present invention will not cause Cr waste. In addition, the deposited metal of the present invention will not excessively contain Ni or contains Ni. Therefore, the flux-cored welding wire of the present invention will not cause Ni waste.

2. The filling ratio can be controlled in the range of 5%-25% (preferably 10%-20%) and the thickness of the shell can be above 0.3 mm, which can greatly reduce the broken rate on the welding wire in the multi (including two times, three times or more) drawing process.

3. The present invention can reduce material costs for making the flux-cored welding wire for welding 400 series of stainless steels. This is so because 300 series of stainless steels contain relatively higher percentages of chromium and nickel, which causes higher prices for 300 series of stainless steels. In addition, 400 series of stainless steels are standard steels which can be bought from the market without requiring special order.

4. When using the flux-cored welding wire made from 400 series of stainless steels to weld the workpieces also made from 400 series of stainless steels, the difference between the percentages of the compositions in the deposited metal and the workpieces is negligible or small. Therefore, using the flux-cored welding wire of the present invention can avoid waste and improve welding quality.

5. The shell made of 400 series of stainless steels of the present invention contains 10-18% of Cr by weight. As in one embodiment of the present invention, the 410 stainless steel shell of the present invention comprises 11.5%-13.5% of Cr and in another embodiment of the present invention, the 409 stainless steel shell of the present invention comprises 10.5%-11.75% of Cr. However, the carbon steel strip does not comprise Cr. When using the flux-cored welding wires with the two different shells (i.e., carbon steel shell or stainless steel shell), both of the deposited metals formed after the welding can comprise 10%-19% of Cr. However, welding is an energetic metallurgical reaction, during which the welding wire melts so as to transfer molten liquid metals to the workpieces to be welded. Therefore, during the welding process, the molten liquid metals will contact with gas medium and be partially burnt. Experiments show that, when the flux-cored welding wire with a carbon steel shell is used in the welding process, at least 0.5% of Cr (by weight of the flux-cored welding wire) will be lost. By comparison, when the flux-cored welding wire with stainless steel shell is used in the welding process, less than 0.1% of Cr will be lost. In addition, because the shell made from carbon steel contains only small percentages of compositions required by deposited metal (except iron), the metal compositions (except iron) required in the deposited metal are added into the flux to meet the percentage requirements for them, which causes relatively larger lose of the compositions during welding process. Moreover, under practical working condition where shield gas exists, the gap of Cr loss rate between these two kinds of welding wires (i.e., with carbon steel shell or with stainless steel shell) will be even greater. For any countries (especially China) that are short of Cr and Ni resources, the flux-cored welding wire of the present invention is a solution to solve this problem.

6. In embodiments of the present invention, because the flux-cored welding wire is made of 400 series of stainless steels, the chemical compositions are more uniformly distributed in the deposited metal formed after the welding. The filling ratio of the flux-cored welding wire with a 400 series stainless steel shell is 5%-25% (preferably 10%-20%). The higher filling ratio means that more powders are wrapped in the welding wire and the compositions in the flux are more unstable. As a result, the chemical compositions of the deposited metal are more unstable. The lower filling ratio means that few powders are wrapped in the welding wire and the compositions in the flux are more stable. As a result, the chemical compositions of the deposited metal are more stable.

7. The flux-cored welding wire with a 400 series stainless steel shell of the present invention has a good anti-rust property.

A flux-cored welding wire which is made of carbon steel strip is easy to rust. A normal flux-cored welding wire, which is made of carbon steel strip, becomes rusty after being exposed to the air for about two weeks. Rusty welding wires can hardly meet the requirements for normal use. However, the 400 series of stainless steels have a corrosion-resistant property. Therefore it effectively solves the rust problem thus substantially lowering the requirements for storage conditions of the flux-cored welding wire, and extending the storage time of the flux-cored welding wire.

8. The flux-cored welding wire with a 400 series stainless steel shell of the present invention has a small resistance.

The flux-cored welding wire with a 400 series stainless steel shell of the present invention has a small resistance, thus improving the welding property of the flux-cored welding wire.

9. The inventors noticed that 400 series of stainless steels are more widely used in industry and this trend is expected to continue. Therefore, the flux-cored welding wire of the present invention has high use value and good market prospect.

The embodiments of the present invention are used to illustrate the invention and are not intended to limit the scope of the claims. It is understood that many variations and modifications will occur to those skilled in the art and the appended claims are intend to cover all such variations and modifications as fall within the scope of the present invention.

The invention claimed is:

1. A flux-cored welding wire for welding together ferritic stainless steel parts, comprising:
    a stainless steel shell enclosed to form a tubular or circular cavity therein that contains flux, wherein the stainless steel shell is a 400 series stainless steel comprising between 10% and 18% chromium (Cr) by weight.

2. The flux-cored welding wire of claim 1, wherein:
    the stainless steel shell has been stretched by a stretching ratio of between 20% and 30% during manufacture of the flux-cored welding wire.

3. The flux-cored welding wire of claim 1, wherein:
    the stainless steel shell comprises 5% or less nickel (Ni) by weight.

4. The flux-cored welding wire according to claim 3, wherein:
    the stainless steel shell is substantially free of Ni.

5. The flux-cored welding wire of claim 1, wherein:
    the stainless steel shell is made of 409-type or 410-type stainless steel.

6. The flux-cored welding wire according to claim 1, wherein:
    the flux consists essentially of:
        between 9% and 68% Cr by weight;
        between 1% and 10% manganese (Mn) by weight;
        between 2% and 15% silicon (Si) by weight; and
        between 7% and 88% iron (Fe).

7. The flux-cored welding wire according to claim 1, wherein:
    the flux-cored welding wire is configured to produce a stainless weld deposit during an arc welding process, wherein the stainless weld deposit consists essentially of:
        between 10% and 20% Cr by weight;
        between 0.1% and 0.8% Mn by weight;
        between 0.1% and 1% Si by weight; and
        between 78% and 90% Fe by weight.

8. The flux-cored welding wire according to claim 1, wherein:
    the flux-cored welding wire is configured to produce a stainless weld deposit that welds together the ferritic stainless steel parts, wherein the stainless weld deposit comprises between 10% and 18% Cr by weight.

9. The flux-cored welding wire according to claim 8, wherein:
    the stainless weld deposit comprises less than 5% of nickel by weight.

10. The flux-cored welding wire according to claim 8, wherein:
    the stainless weld deposit is a 400 series of stainless steel weld deposit.

11. A flux-cored welding wire for welding together ferritic stainless steel parts comprises a stainless steel shell enclosed to form a tubular or circular cavity that contains flux, wherein the flux consists essentially of:
    between 9% and 68% chromium (Cr);
    between 1% and 10% manganese (Mn);
    between 2% and 15% silicon (Si); and
    between 78% and 90% iron (Fe) by weight.

12. The flux-cored welding wire of claim 11, wherein:
    the stainless steel shell comprises between 10% and 18% Cr by weight.

13. The flux-cored welding wire according to claim 12, wherein:
    the flux accounts for between 5% and 25% of the flux-cored welding wire by weight.

14. The flux-cored welding wire of claim 11, wherein:
    the stainless steel shell comprises 5% or less nickel (Ni) by weight.

15. The flux-cored welding wire according to claim 14, wherein:
    the stainless steel shell is substantially free of Ni.

16. The flux-cored welding wire of claim 11, wherein:
    the stainless steel shell is made of a 400 series stainless steel.

17. The flux-cored welding wire according to claim 11, wherein:
    the flux-cored welding wire is configured to produce a stainless weld deposit on a stainless steel workpiece, wherein the stainless weld deposit comprises between 10% and 18% Cr by weight.

18. The flux-cored welding wire according to claim 17, wherein:
   the stainless weld deposit comprises less than 5% of nickel by weight.

19. The flux-cored welding wire according to one of claim 18, wherein:
   the stainless weld deposit is a 400 series of stainless steel weld deposit.

20. The flux-cored welding wire according to claim 11, wherein:
   the flux-cored welding wire is drawn multiple times during manufacturing.

21. The flux-cored welding wire of claim 20, wherein:
   the stainless steel shell has been stretched by a stretching ratio of between 20% and 30% during manufacture of the flux-cored welding wire.

22. A ferritic stainless steel weld deposit that welds together ferritic stainless steel parts, wherein the ferritic stainless steel weld deposit is formed during an arc welding operation using a welding electrode that includes a stainless steel shell enclosed to form a tubular or circular cavity that contains flux, and wherein the flux consists essentially of: chromium (Cr), manganese (Mn), silicon (Si), and iron (Fe).

23. The ferritic stainless steel weld deposit of claim 22, wherein the flux consists essentially of:
   between 9% and 68% chromium (Cr);
   between 1% and 10% manganese (Mn);
   between 2% and 15% silicon (Si); and
   between 78% and 90% iron (Fe) by weight.

24. The ferritic stainless steel weld deposit of claim 23, wherein the stainless steel shell and the ferritic stainless steel weld deposit are both 400 series stainless steel.

* * * * *